(12) United States Patent
Nishimura

(10) Patent No.: US 7,298,514 B2
(45) Date of Patent: Nov. 20, 2007

(54) NETWORK PRINT SYSTEM AND PRINTING METHOD

(75) Inventor: Shunsuke Nishimura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 10/441,001

(22) Filed: May 20, 2003

(65) Prior Publication Data
US 2003/0231337 A1    Dec. 18, 2003

(30) Foreign Application Priority Data
May 29, 2002  (JP)  ............................. 2002-155634
May 7, 2003   (JP)  ............................. 2003-129157

(51) Int. Cl.
*G06F 15/00*    (2006.01)
*G06K 1/00*     (2006.01)

(52) U.S. Cl. .................... 358/1.15; 358/1.16; 382/305; 700/235; 709/229

(58) Field of Classification Search ............... 358/1.15, 358/1.16; 382/305; 700/235; 709/229
See application file for complete search history.

(56) References Cited

U.S. PATENT DOCUMENTS

| | | | | |
|---|---|---|---|---|
| 6,674,923 B1 * | 1/2004 | Shih et al. | ................. | 382/305 |
| 6,816,752 B1 * | 11/2004 | Wang | ......................... | 700/235 |
| 7,145,679 B2 * | 12/2006 | Hitaka | ....................... | 358/1.15 |
| 7,148,989 B2 * | 12/2006 | Hitaka | ....................... | 358/1.16 |
| 7,167,260 B2 * | 1/2007 | Iwata et al. | ................ | 358/1.15 |
| 2002/0178272 A1 * | 11/2002 | Igarashi et al. | ............. | 709/229 |
| 2003/0025939 A1 * | 2/2003 | Jeran et al. | ................ | 358/1.16 |

* cited by examiner

Primary Examiner—Douglas Q. Tran
Assistant Examiner—Satwant Singh
(74) Attorney, Agent, or Firm—Fitzpatrick, Cella, Harper & Scinto

(57) ABSTRACT

When printing apparatuses in a print shop cannot realize print setting shown by downloaded print set information, substitute print setting of a smaller difference degree is proposed to the user or a plurality of print settings are proposed to the user, thereby enabling printed matter to be outputted in accordance with desired setting of the user.

8 Claims, 12 Drawing Sheets

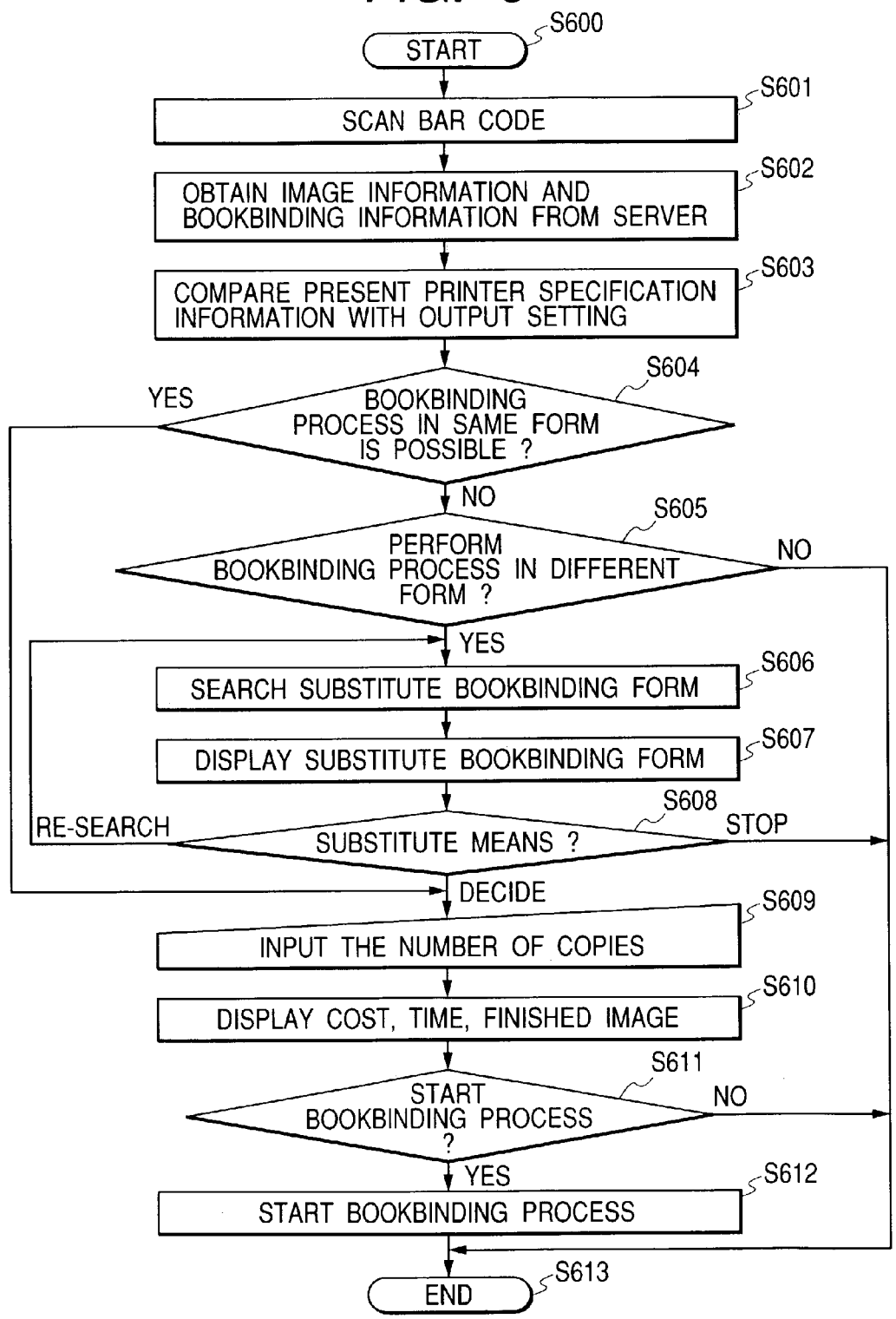

FIG. 7

| | MONOCHRO/COLOR PRINT | RESOLUTION | POST-PROCESSING FUNCTION | JUDGMENT |
|---|---|---|---|---|
| BOOKBINDING INFORMATION 203 | COLOR PRINT | 600dpi | DOUBLE BINDING | — |
| IMAGE FORMING APPARATUS 505 | MONOCHRO PRINT | 600dpi | NONE | × |
| IMAGE FORMING APPARATUS 506 | COLOR PRINT | 600dpi | NONE | × |
| IMAGE FORMING APPARATUS 507 | MONOCHRO PRINT | 1200dpi | CORNER BINDING·2-HOLE PUNCH·CENTER BINDING | × |
| IMAGE FORMING APPARATUS 508 | COLOR PRINT | 1200dpi | CORNER BINDING·2-HOLE PUNCH·CENTER BINDING | × |

FIG. 8

| OUTPUTTING FUNCTION | | OUTPUTTING FUNCTION POINT |
|---|---|---|
| COLOR PRINT OR MONOCHRO PRINT | COLOR PRINT | 5pt |
| | MONOCHRO PRINT | 0pt |
| RESOLUTION | 1200dpi | 5pt |
| | 800dpi | 2pt |
| | 600dpi | 0pt |
| POST-PROCESSING FUNCTION | CENTER BINDING | 5pt |
| | DOUBLE BINDING | 3pt |
| | CORNER BINDING | 2pt |
| | 2-HOLE PUNCH | 1pt |
| | NONE | 0pt |

FIG. 9

| | OUTPUTTING APPARATUS | OUTPUTTING FUNCTION POINT $P_A$ (COLOR PRINT OR MONOCHRO PRINT) | OUTPUTTING FUNCTION POINT $P_B$ (RESOLUTION) | OUTPUTTING FUNCTION POINT $P_C$ (POST-PROCESSING FUNCTION) |
|---|---|---|---|---|
| SUBSTITUTE MEANS 1 | IMAGE FORMING APPARATUS 505 | 0pt (MONOCHRO PRINT) | 0pt (600dpi) | 0pt (NONE) |
| SUBSTITUTE MEANS 2 | IMAGE FORMING APPARATUS 506 | 5pt (COLOR PRINT) | 0pt (600dpi) | 0pt (NONE) |
| SUBSTITUTE MEANS 3 | IMAGE FORMING APPARATUS 507 | 0pt (MONOCHRO PRINT) | 5pt (1200dpi) | 6pt (CENTER BINDING) |
| SUBSTITUTE MEANS 4 | | | | 2pt (CORNER BINDING) |
| SUBSTITUTE MEANS 5 | | | | 1pt (2-HOLE PUNCH) |
| SUBSTITUTE MEANS 6 | IMAGE FORMING APPARATUS 508 | 5pt (COLOR PRINT) | 5pt (1200dpi) | 6pt (CENTER BINDING) |
| SUBSTITUTE MEANS 7 | | | | 2pt (CORNER BINDING) |
| SUBSTITUTE MEANS 8 | | | | 1pt (2-HOLE PUNCH) |

| | OUTPUTTING APPARATUS | OUTPUTTING FUNCTION POINT $P'_A$ (COLOR PRINT OR MONOCHRO PRINT) | OUTPUTTING FUNCTION POINT $P'_B$ (RESOLUTION) | OUTPUTTING FUNCTION POINT $P'_C$ (POST-PROCESSING FUNCTION) |
|---|---|---|---|---|
| BOOKBINDING INFORMATION 203 | — | 5pt (COLOR PRINT) | 5pt (1200dpi) | DOUBLE BINDING (3pt) |

NETWORK PRINT SYSTEM AND PRINTING METHOD

BACKGROUND OF THE INVENTION

1. Field of the Invention

The invention relates to a network print system and its printing method of proposing substitute means which is used in the case where a printing apparatus cannot realize setting of print set information when printed matter is outputted by the printing apparatus in a print shop which is connected via the Internet on the basis of the print set information such as picture quality, post-process, and the like on the basis of document information such as an image, characters, and the like.

2. Related Background Art

In the conventional technique, when document information and print set information stored in a server are downloaded into a print shop via the Internet and printed matter is outputted, if a printing apparatus provided in the print shop can realize print setting (for example, color print, resolution is set to 1200 dpi, and post-processing function is set to corner binding) shown by the print set information, the printing apparatus in the print shop outputs the printed matter in accordance with the print setting. If the printing apparatus provided in the print shop cannot realize print setting shown by the print set information, one of the following operations is selected: (1) the print is executed without using the print set information; (2) the print is executed in accordance with print setting which has newly been set by the user; and (3) the most similar print setting is presented to the user on the basis of the print set information and the user can determine whether he prints or not.

SUMMARY OF THE INVENTION

However, the user often feels that it is tiring to decide the print setting. There is a possibility that the user who is weak in execution of the print setting performs print setting which is quite different from the print set information. Completely different printed matter is outputted in such a case.

When the most similar print setting is presented to the user, there is a case where similarity is not sufficient. Even if a print system determines that the print setting is most similar to the print setting shown by the downloaded print set information, the user does not always judge in a manner similar to the above. Even if the user judged in a manner similar to the above, at that time, the user does not always demand to output printed matter by the print setting that is most similar to the print setting shown by the downloaded print set information. Therefore, even if the print setting that is most similar to the print setting shown by the print set information is merely presented to the user, the needs of the user cannot be met.

The invention is made in consideration of the foregoing problems. When a printing apparatus in a print shop cannot realize print setting shown by downloaded print set information, more similar substitute print setting can be proposed to the user, or a plurality of substitute print settings are proposed to the user so as to urge him to select a desired one of them, thereby printed matter can be outputted by the desired print setting of the user.

BRIEF DESCRIPTION OF THE DRAWINGS

FIG. 6 is a flowchart showing processes which are executed in a print shop 512 when the user 511 desires a copy of a book;

FIG. 7 is a diagram showing an example in which bookbinding information received from a Web server is compared with outputting functions of image forming apparatuses provided in the print shop and whether an output in a same form as that of the book is possible or not is discriminated;

FIG. 8 is a diagram showing an outputting function point table necessary to calculate a point of the outputting function;

FIG. 9 is a diagram showing outputting function points of the image forming apparatuses provided in the print shop and outputting function points of the bookbinding information showing a bookbinding form of the book based on the outputting function point table;

DETAILED DESCRIPTION OF THE PREFERRED EMBODIMENT

An embodiment of the invention will be described hereinbelow with reference to the drawings.

Figure 1:
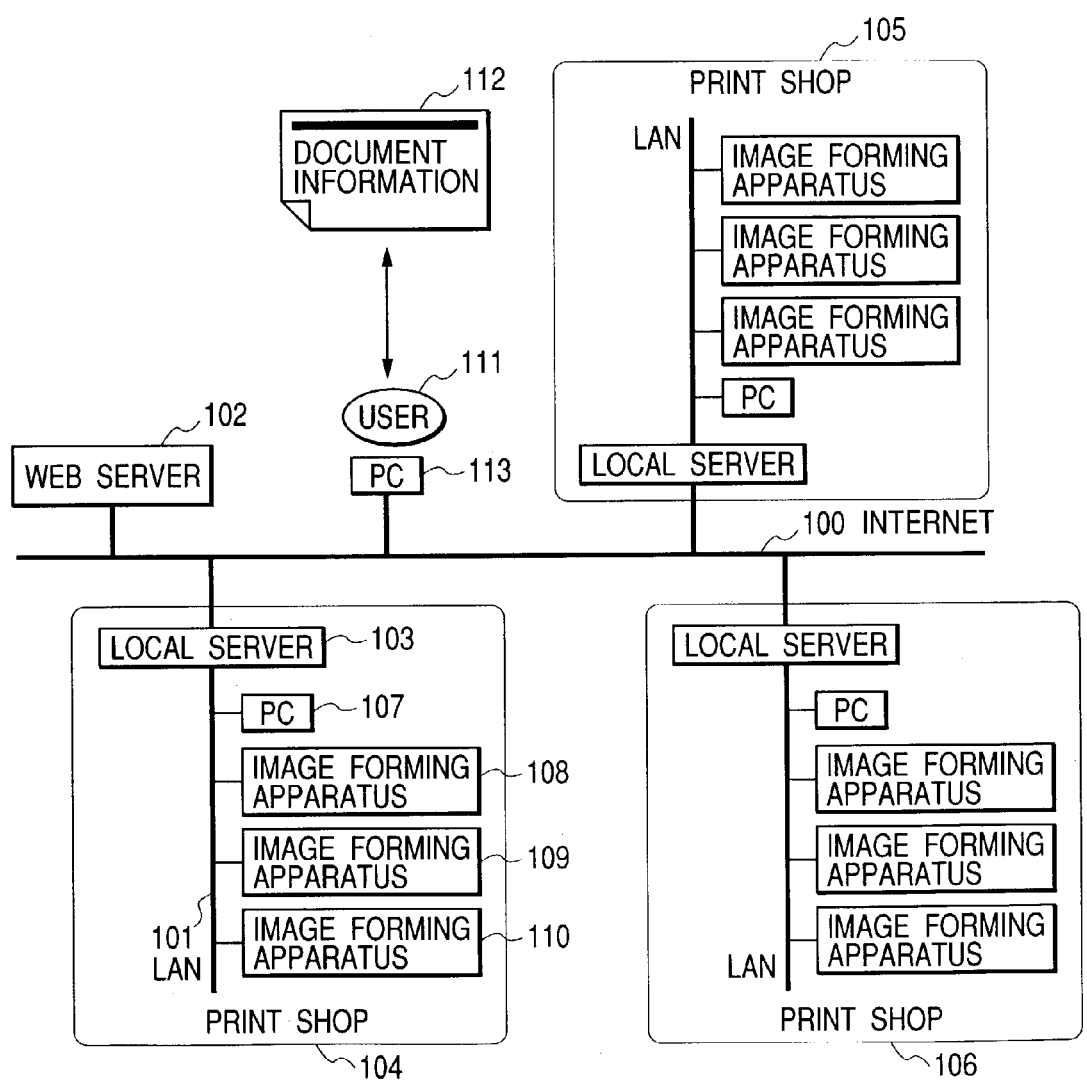
FIG. 1 is a constructional diagram showing a whole system.

FIG. 1 is a constructional diagram showing a whole system of the embodiment. Reference numeral 111 denotes a user who issues a book of the first edition; 112 document information to perform a print and a bookbinding process; and 113 a personal computer (hereinafter, referred to as a PC) connected to the Internet.

Reference numerals 104, 105, and 106 denote print shops for issuing a book or a copy. The user purchases the book or the copy in the print shop. A PC 107, image forming apparatuses 108, 109, and 110 to output a book and a copy, a local server 103, and a LAN 101 to connect them exist in the print shop.

The local server 103 is connected to a Web server 102 via an Internet 100. Document information and bookbinding information including document and image data of a book of the first edition are stored in the Web server 102.

Figure 2:
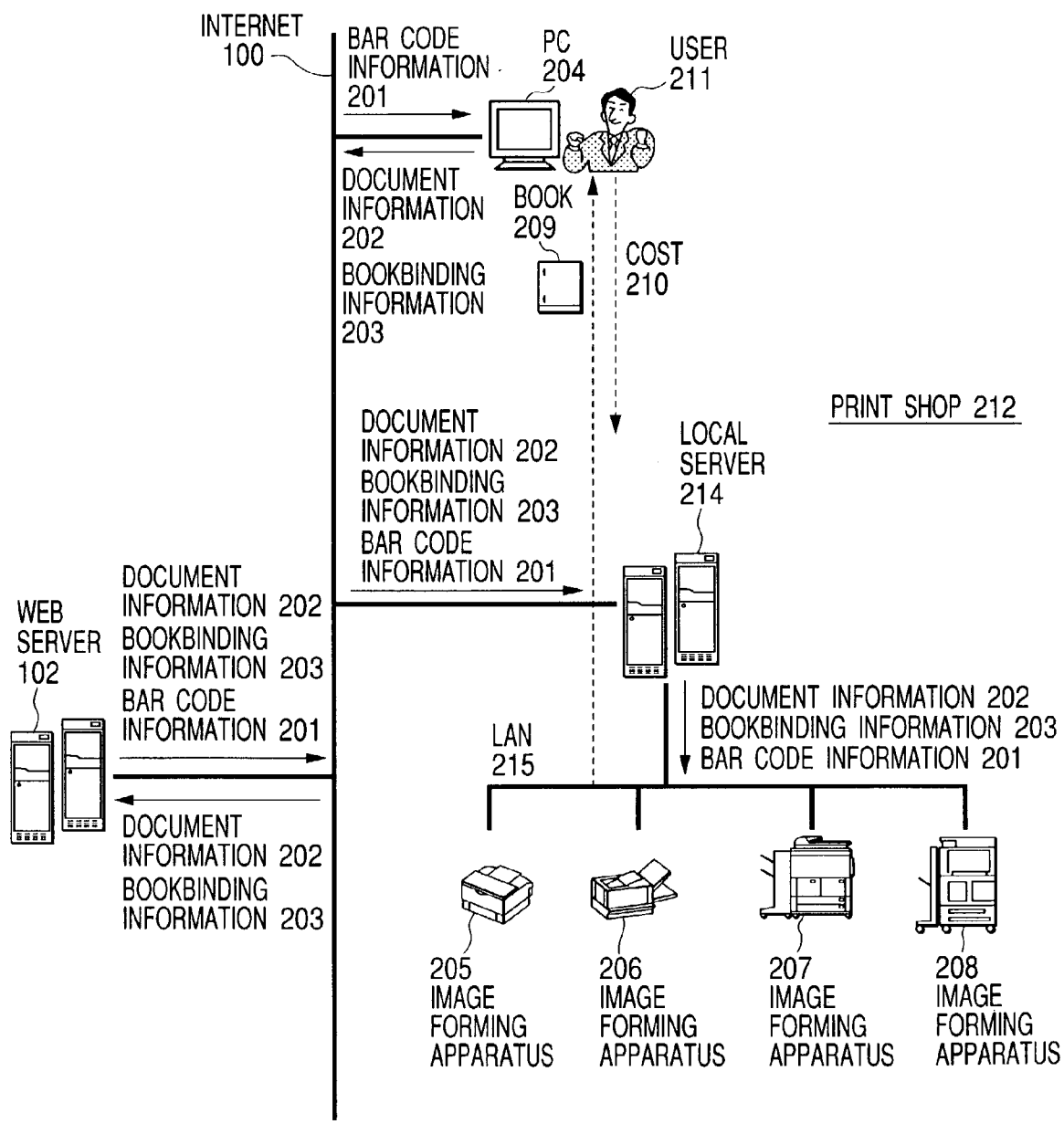
FIG. 2 is a diagram showing a flow of a print process at the time when the user desires an issue of the first edition.

FIG. 2 is a diagram showing a flow of a print process at the time when the user desires the issue of the first edition.

A user 211 inputs document information 202 to be printed and bookbinding-processed to a PC 204 and selects a bookbinding method at the time of performing the print and the bookbinding process of the document information 202 on a display screen of the PC 204. The PC 204 transmits the document information 202 inputted by the user 211 and bookbinding information 203 showing the bookbinding method selected by the user to the Web server 102 via the Internet 100.

The Web server 102 transmits bar code information 201 corresponding to the received document information 202 and bookbinding information 203 to the PC 204 via the Internet 100. The bar code information 201 is used as an ID. The Web server 102 manages an access right to the document information 202 and bookbinding information 203 stored in the Web server 102 on the basis of the bar code information 201. The Web server 102 holds a storing device (not shown) which can store the document information 202, bookbinding information 203, and bar code information 201.

If the user 211 wants the print and the bookbinding process, the Web server 102 transmits the document information 202, bookbinding information 203, and bar code information 201 to a local server 214. After the local server 214 received the document information 202, bookbinding information 203, and bar code information 201, it adds the bar code information 201 to the document information. The local server 214 transmits the document information 202 to which the bar code information 201 has been added and the bookbinding information 203 to one of image forming apparatuses 205, 206, 207, and 208 via a local area network (hereinafter, abbreviated to LAN) 215. One of the image forming apparatuses 205 to 208 executes the print and the bookbinding process in accordance with the bookbinding information 203 on the basis of the bar code information 201 and the document information 202, thereby forming a book 209. The user 211 pays a cost 210 including charges for the print and the bookbinding process of the book 209, use charges for the storing device in the Web server 102, and the like.

Figure 3:
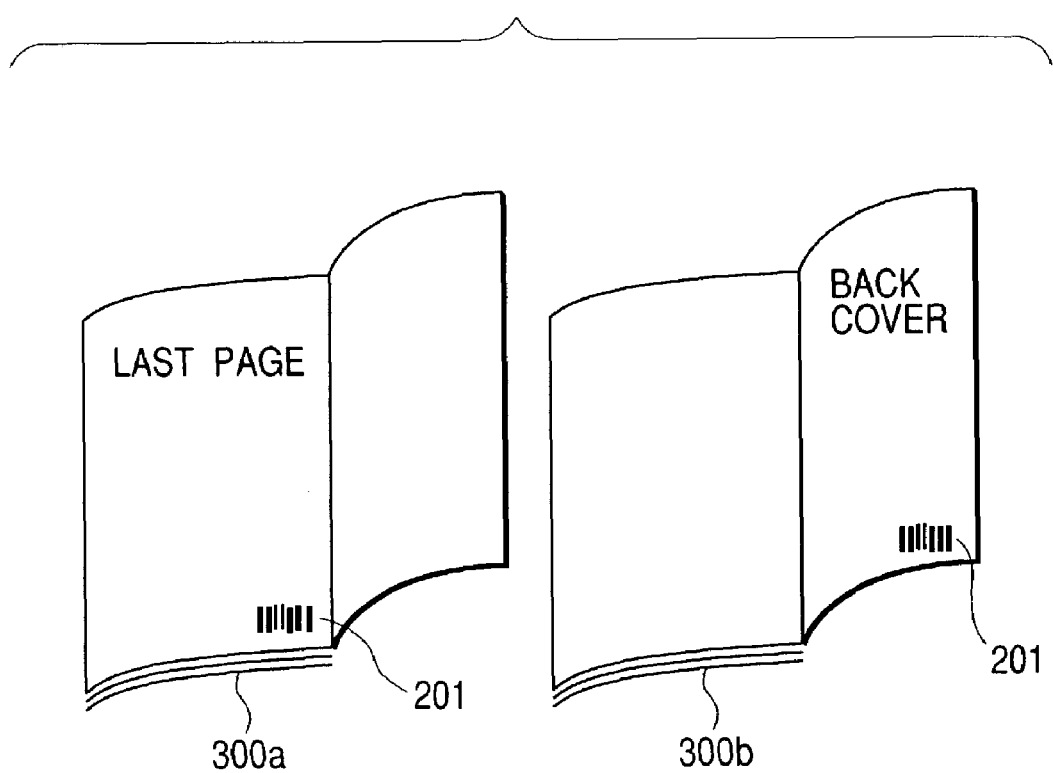
FIG. 3 is a diagram showing an example of a book to which bar code information has been added.

FIG. 3 shows the book 209 to which the bar code information 201 has been added. The bar code information 201 has been printed onto the last page in the case of a book 300a. The bar code information 201 has been printed onto the back cover in the case of a book 300b.

Figure 4:
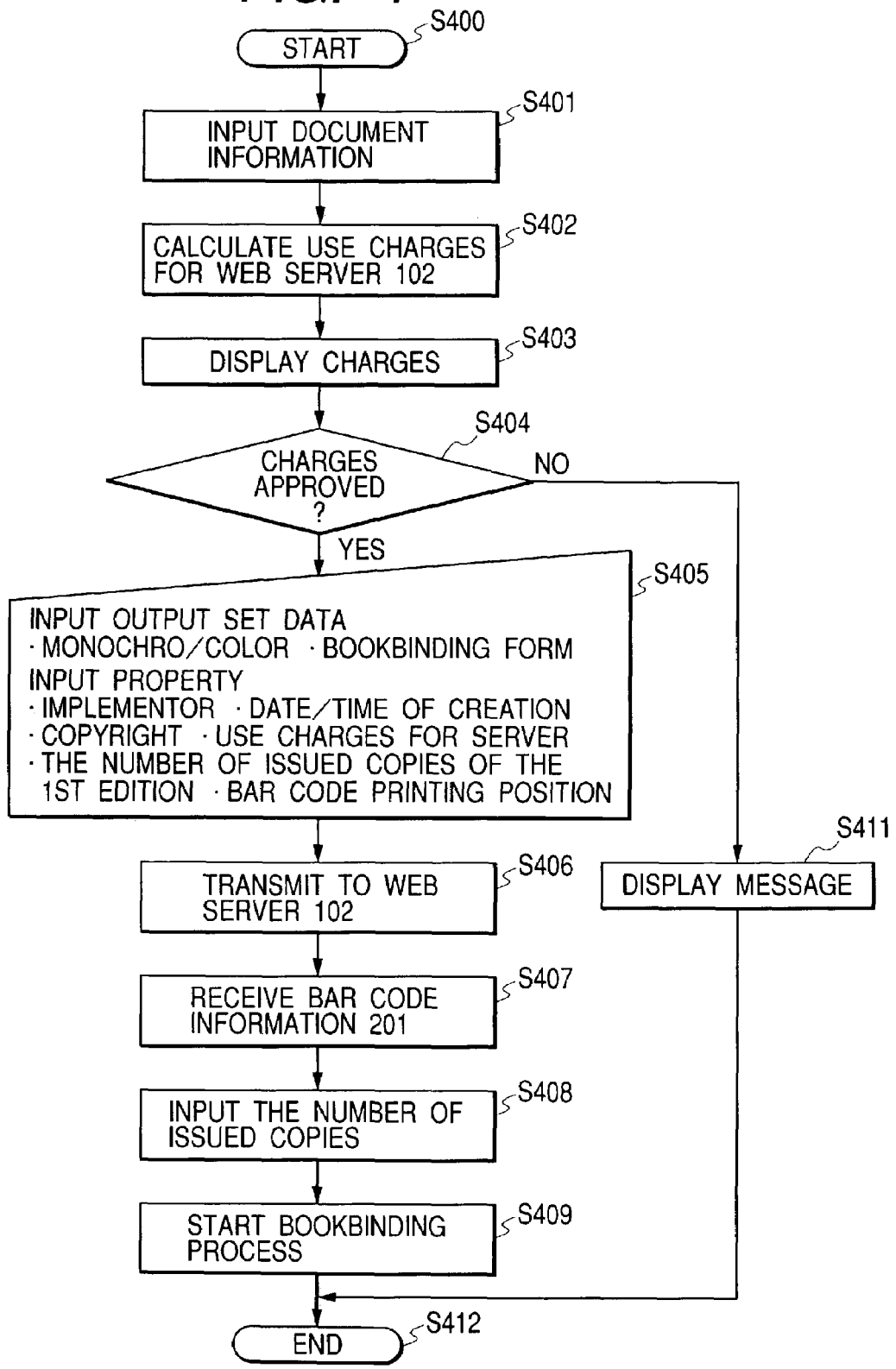
FIG. 4 is a flowchart showing processes which are executed in a print shop 212 when the user 211 desires the issue of the first edition.

FIG. 4 is a flowchart showing processes which are executed in a print shop 212 when the user 211 desires to issue the first edition. The user 211 inputs the document information 202 to be printed and bookbinding-processed to the PC 204 existing in the print shop 212 via a media such as a floppy (registered trademark) disk or the like (step S401).

Subsequently, the PC 204 calculates server use charges to use the Web server 102 (S402). The use charges for the Web server 102 are displayed on the PC 204 (S403). The PC 204 discriminates whether the user 211 has approved the displayed use charges or not (S404).

If the user 211 does not approve the displayed use charges for the Web server 102, the PC 204 displays a message to interrupt the print of the printed matter (S411) and finishes the processing routine (S412).

If the user 211 approves the use charges for the displayed Web server 102, he inputs output set data and a property to output the book 209 on the PC 204 (S405). The output set data shows an outputting function of the image forming apparatus for outputting the book 209, for example, a bookbinding form such as monochromatic (black and white) print (hereinafter, simply referred to as a monochro print) or color print, punch, binding, or the like. The property shows an implementor, date/time of the creation, a copyright, use charges for the Web server 102, and the number of issued copies of the first edition.

The PC 204 transmits the inputted output set data and property as bookbinding information to the Web server 102 via the local server 214 and Internet 100 (S406). At the same time, the PC 204 also transmits the document information 202 to the Web server 102. The local server 214 receives the bar code information 201 from the Web server 102 (S407).

Subsequently, when the user 211 inputs the number of books which he wants to output (S408), the local server 214 transmits the bar code information 201, document information 202, and bookbinding information 203 to the image forming apparatus, the bookbinding process is started (S409), and the processing routine is finished (S412).

Figure 5:
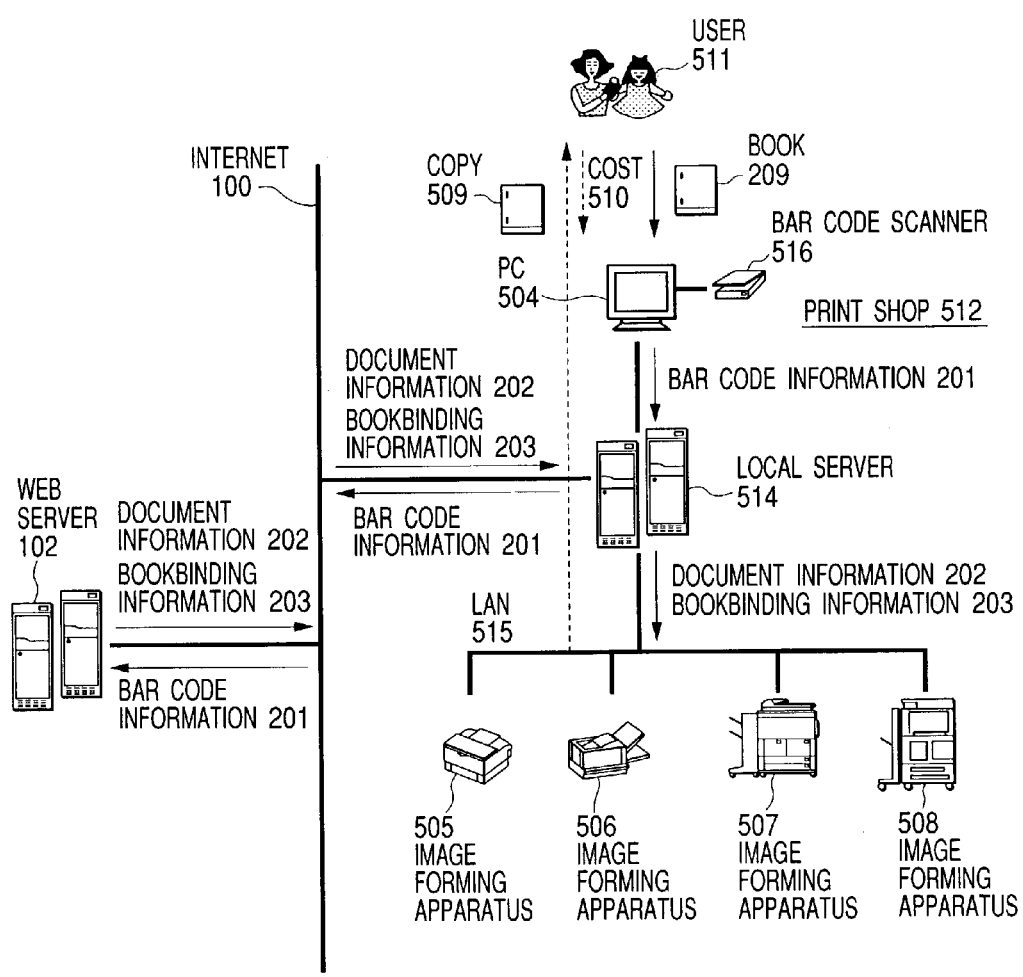
FIG. 5 shows a flow of a print process at the time when the user 511 desires a copy of a book 209.

FIG. 5 is shows a flow of a print process at the time when a user 511 desires a copy of the book 209 on the basis of the bar code information 201 of the book 209 issued as a first edition. The user 511 inputs the bar code information 201 of the book 209 which he wants to copy to a PC 504 by using a bar code scanner 516 connected to the PC 504 existing in a print shop 512.

The PC 504 transmits the bar code information 201 inputted by the user 511 to the Web server 102 via a local server 514 and the Internet 100. The Web server 102 searches the document information of the book 209 and bookbinding information showing the bookbinding form on the basis of the received bar code information 201 and transmits the found document information 202 and bookbinding information 203 to the local server 514 via the Internet 100.

After the local server 514 received the document information 202 and the bookbinding information 203, it transmits them to one of image forming apparatuses 505, 506, 507, and 508. One of the image forming apparatuses 505 to 508 executes the print and the bookbinding process in accordance with the bookbinding information 203 on the basis of the document information 202, thereby forming a copy 509. The user 511 pays a cost 510 including charges for the print and the bookbinding process of the copy 509.

FIG. 6 is a flowchart showing processes which are executed in the print shop 512 when the user 511 desires a copy of a book. The user 511 allows the bar code information 201 added to the book 209 to be read by using the bar code scanner 516 connected to the PC 504 (S601). The PC 504 transmits the bar code information 201 read by the bar code scanner 516 to the Web server 102 and receives the document information 202 and the bookbinding information 203 (S602).

The PC 504 compares the bookbinding information 203 with the outputting functions of the image forming apparatuses 505 to 508 provided in the print shop 512 (S603). On the basis of comparison results, whether the print and the bookbinding process can be performed in the same form as that of the book 209 or not (the print and the bookbinding process can be performed in the form shown by the bookbinding information 203 or not) is discriminated (S604).

If the print and the bookbinding process can be performed in the same form, in accordance with the input of the number of copies which the user 511 wants to output (S609), the PC 504 displays a cost, a time, a finished image (S610). The PC 504 urges the user 511 to select whether the bookbinding process is started or not and discriminates whether the bookbinding process is started or not (S611). When the user 511 selects the start, the print and the bookbinding process are started (S612) and the processing routine is finished (S613). When the user 511 selects the non-start, the processing routine is finished as it is (S613).

If it is determined in S604 that the bookbinding process in the same form as that of the book 209 is impossible, the PC 504 urges the user 511 to discriminate whether he executes the bookbinding process in a form different from that of the book 209 or not (S605). When the user 511 selects that he does not execute the bookbinding process in the different bookbinding form, the processing routine is finished as it is (S613). When the user 511 selects that the bookbinding process is performed in the different bookbinding form, the PC 504 searches substitute bookbinding forms in place of the bookbinding form shown by the bookbinding information 203 on the basis of the bookbinding information 203 (S606) and sequentially displays a plurality of substitute bookbinding forms to the user 511 from the substitute bookbinding form of the small difference degree (S607).

The user 511 has three selecting items of "decide", "re-search", and "stop" with respect to a plurality of substitute bookbinding forms displayed by the PC 504. Therefore, which one of "decide", "re-search", and "stop" has been selected is discriminated (S608).

If the user 511 selects "decide", the PC 504 executes processes in steps S609 to S612 in order to perform the print and the bookbinding process in the decided substitute bookbinding form. If the user 511 selects "re-search", the PC 504 displays the substitute bookbinding form of the next small difference degree and urges again the user 511 to select. Until the user 511 selects "decide", the PC 504 sequentially displays the substitute bookbinding forms from the form of the smaller difference degree (S607). If the user 511 does not select "decide" even after completion of the display of all of the substitute bookbinding forms, the substitute bookbinding form of the smallest difference degree is displayed again and the above processes are repeated. If the user 511 selects "stop", the processing routine is finished (S613).

FIG. 7 is a diagram showing an example in which the bookbinding information 203 received from the Web server 102 is compared with the outputting functions of the image forming apparatuses 505 to 508 provided in the print shop 512 and whether the output in the same form as that of the book 209 is possible or not is discriminated (whether the output in the form shown by the bookbinding information 203 is possible or not).

FIG. 7 shows the bookbinding information 203 (color print, 600 dpi, center binding) at the time of performing the print and the bookbinding process of the book 209 and the outputting functions of the image forming apparatuses 505, 506, 507, and 508 provided in the print shop 512, respectively. If the outputting function of each of the image forming apparatuses 505 to 508 includes all of the functions of the bookbinding information 203 among three discrimination elements (monochrome or color print, resolution, post-processing function), it is determined that the bookbinding process in the same form is possible. If it does not include at least one of them, it is determined that the bookbinding process in the same form is impossible.

In the case of the image forming apparatus 505, it is determined that the output in the same form is impossible from a viewpoint that the monochro print is performed and there is no post-processing function. In the case of the image forming apparatus 506, it is determined that the output in the same form is impossible because there is no post-processing function. In the case of the image forming apparatus 507, it is determined that the output in the same form is impossible because the monochro print is performed and there is no double binding function. In the case of the image forming apparatus 508, it is determined that the output in the same form is impossible because there is no double binding function.

FIG. 8 shows an outputting function point table necessary to calculate the outputting function point in order to search and display the substitute bookbinding forms in steps S606 and S607 in FIG. 6. A point has been set every item of the outputting function. For example, the outputting function points have been set in a manner such that the color print is set to 5 pt, the resolution of 1200 dpi is set to 5 pt, and the 2-hole punch of the post-processing function is set to 1 pt.

FIG. 9 is a diagram showing the outputting function points of the image forming apparatuses 505, 506, 507, and 508 provided in the print shop 512 and the outputting function points of the bookbinding information 203 which are calculated on the basis of the outputting function point table of FIG. 8.

All combinations are considered on the basis of the functions of the image forming apparatus 505 of "monochro print, resolution 600 dpi, and there is no post-processing function", the functions of the image forming apparatus 506 of "color print, resolution 600 dpi, and there is no post-processing function", the functions of the image forming apparatus 507 of "monochro print, resolution 1200 dpi, post-processing function 2-hole punch, corner binding, and center binding", and the functions of the image forming apparatus 508 of "color print, resolution 1200 dpi, post-processing function 2-hole punch, corner binding, and center binding" and substitute means 1 to 8 are mentioned.

Subsequently, in the substitute means 1 to 8, outputting function points $P_{Ai}$, $P_{Bi}$, $P_{Ci}$ (i=1 to 8) are obtained every outputting function (color print or monochrome print, resolution, post-processing function), respectively. As outputting function points of the book 209, outputting function points $P'_A$, $P'_B$ and $P'_C$ are obtained every outputting function (color print or monochrome print, resolution, post-processing function) on the basis of the bookbinding information 203, respectively.

Figure 10:
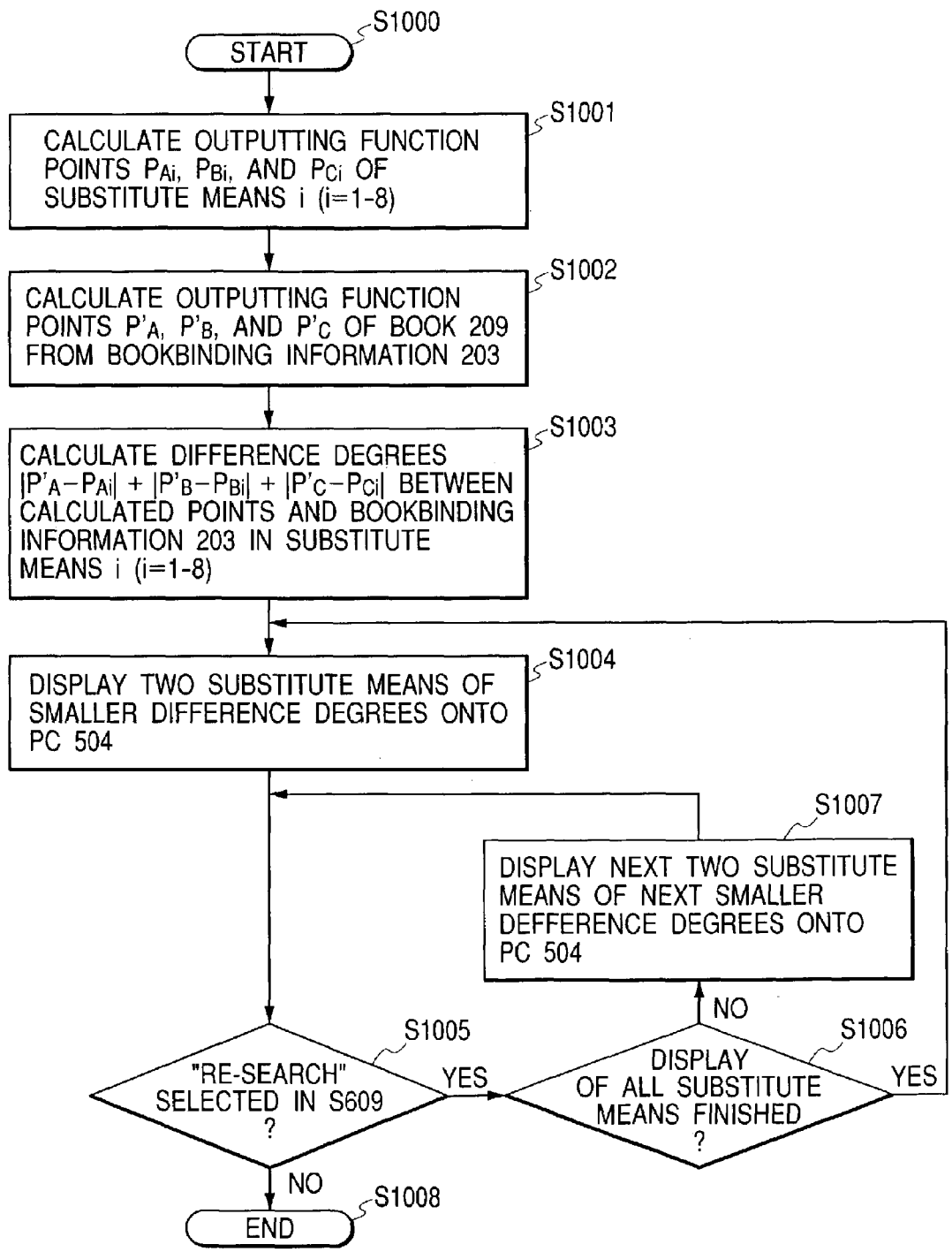
FIG. 10 is a flowchart showing processes for selecting substitute means similar to the bookbinding form of the book from substitute means and displaying the selected substitute means onto a PC.

FIG. 10 is a flowchart showing processes for calculating the outputting function points of the substitute means 1 to 8 shown in FIG. 9 and the outputting function points of, selecting the substitute bookbinding forms similar to the bookbinding form of the book 209 from the eight substitute means, and displaying the selected substitute bookbinding forms onto the PC 504.

First, the outputting function points $P_{Ai}$, $P_{Bi}$, $P_{Ci}$ (i=1 to 8) of the substitute means 1 to 8 are obtained (S1001). Subsequently, the outputting function points $P'_A$, $P'_B$, and $P'_C$ are obtained from the bookbinding information 203 (S1002).

Difference degrees $|P'_A - P_{Ai}| + |P'_B - P_{Bi}| + |P'_C - P_{Ci}|$ (i=1 to 8) are calculated (S1003). It is determined that the substitute bookbinding form in which the difference degree is smaller is the bookbinding form similar to that of the book 209.

Two substitute means of the smallest and the second smallest difference degrees are selected and displayed onto the PC 504 so as to be presented as substitute bookbinding forms (S1004). If "decide" or "stop" is selected in step S608 in FIG. 6, the processing routine is finished (S1008). If the user 511 selects "re-search" in step S608 in FIG. 6 and the display of all of the substitute means is not finished yet (NO in S1006), two substitute means of the next small difference degrees are selected (if there is only one substitute means, one substitute means is selected) and displayed as substitute bookbinding forms onto the PC 504 (S1007). Further, if the user 511 selects "re-search" in step S608 in FIG. 6 and the display of all of the substitute means has been finished (YES in S1006), two substitute means of the smallest and the second smallest difference degrees are selected again and displayed onto the PC 504 (S1004). The above processes are repeated while "re-search" is selected in step S608 in FIG. 6.

Figure 11:
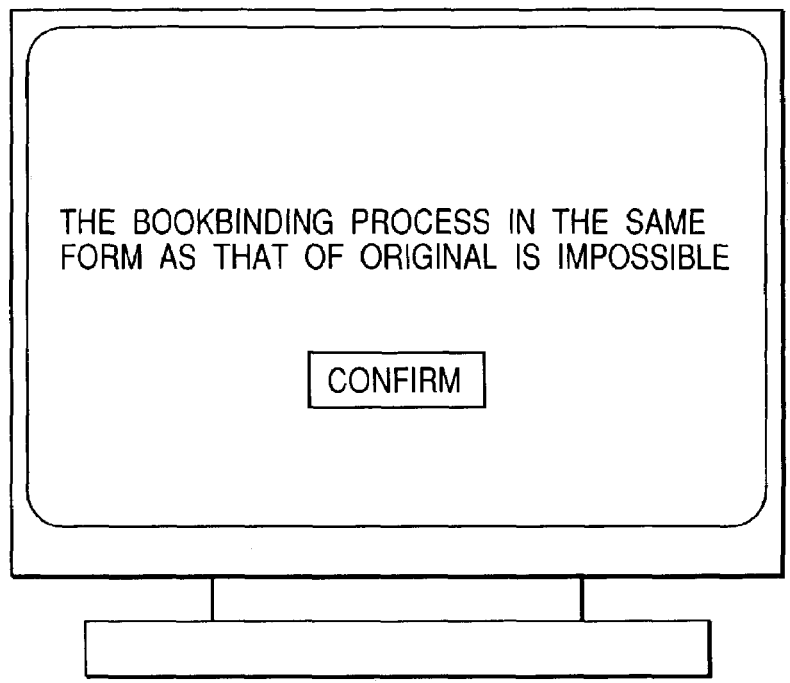
FIG. 11 is a diagram showing a display example if it is determined that an output in the same form as that of the book 209 is impossible.

FIG. 11 shows a display example in the case where the bookbinding information 203 is compared with the outputting functions of the image forming apparatuses 505 to 508 provided in the print shop 512 in step S603 in FIG. 6 and it is determined in step S604 in FIG. 6 that the output in the same form as that of the book 209 is impossible.

Figure 12:
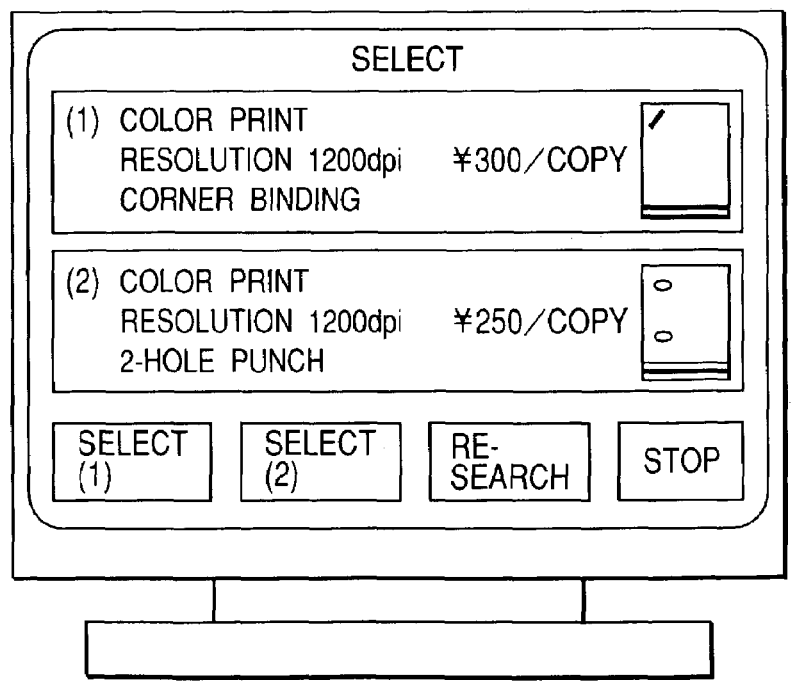
FIG. 12 is a diagram showing a display screen to select the substitute means.

FIG. 12 shows a display screen which is displayed in step S607 in FIG. 6. The substitute means 7 of the smallest difference degree (the image forming apparatus 508, color print, resolution 1200 dpi, corner binding) and the substitute means 8 of the second smallest difference degree (the image forming apparatus 508, color print, resolution 1200 dpi, 2-hole punch) are displayed as substitute bookbinding forms.

Figure 13:
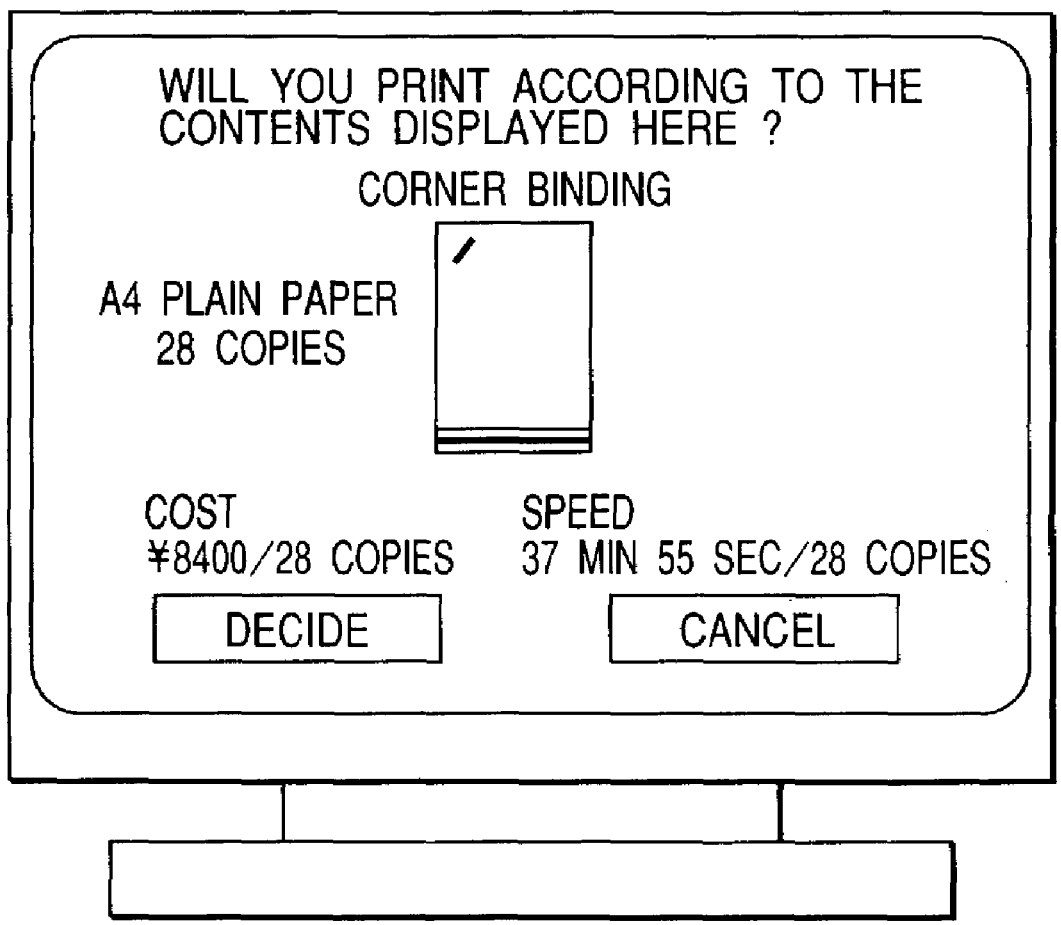
FIG. 13 is a diagram showing a confirmation display screen to discriminate whether a bookbinding process is started or not.

FIG. 13 shows a confirmation display screen to discriminate whether the bookbinding process is started or not and this display screen is displayed in step S611 in FIG. 6. If the user 511 selects "decide", the print and the bookbinding process are started (S612 in FIG. 6). If he selects "cancel", the processing routine is finished (S613 in FIG. 6).

As described above, according to the invention, even if the printing apparatuses provided in the print shop cannot realize the print setting shown by the print set information, the printed matter can be outputted in accordance with the print setting close to the print set information without performing the fine print setting by the user.

Or, according to the invention, if the printing apparatuses provided in the print shop cannot realize the print setting shown by the print set information, by sequentially providing a plurality of print settings to the user from the print setting that is closest to the print setting shown by the print set information and urging the user to select, the printed matter can be outputted not only the setting closest to the print setting shown by the print set information but also the user's desired print setting different from the print setting shown by the downloaded print set information, so that it is possible to cope with needs of various users.

What is claimed is:

1. A network print system comprising:
   an information storing unit adapted to store document information and print set information showing print setting upon printing of the document information;
   a print output unit adapted to print on the basis of the document information;
   a discriminating unit adapted to compare a print setting which can be realized by said print output unit with the print setting shown by the print set information to discriminate whether a print based on the print set information can be performed in said print output unit or not;
   a calculating unit adapted to calculate a difference degree between the print setting shown by the print set information and each of a plurality of types of print settings which can be realized by said print output unit and is different from the print setting shown by the print set information; and
   a substitute presenting unit adapted to, if it is determined by said discriminating unit that the print cannot be preformed, present one of the plurality of types of print settings, in which the difference degree calculated by said calculating unit is smaller than the other of the plurality of types of print settings, as a substitute print setting for the print setting shown by the print set information.

2. A network print system according to claim 1 comprising:
   a selecting unit adapted to allow the user to select desired print setting from said plurality of substitute print settings which are presented by said substitute presenting unit,
   wherein said print output unit prints on the basis of the docoument information in accordanced with the selected substitute print setting.

3. A printing method of making a printing apparatus perform a print based on document information, comprising:
   an information storing step of storing the document information and print set information showing print setting upon printing of the document information;
   a discriminating step of comparing print setting which can be realized by said printing apparatus with the print setting shown by the print set information and discriminating whether the print based on the print set information can be performed in said printing apparatus or not;
   a calculating step of calculating a difference degree between the print setting shown by the print set information and each of a plurality of types of print settings which can be realized in said printing apparatus and is different from the print setting shown by the print set information; and
   a substitute presenting step of, if it is determined in said discriminating step that the print cannot be performed, presenting one of the plurality of types of print settings, in which the difference degree calculated in said calculating step is smaller than the other of the plurality of types of print settings, as a substitute print setting for the print setting shown by the print set information.

4. A method according to claim 3, further comprising:
   a selecting step of making a user select whether the user permits the print in the substitute print setting or not; and
   a printing step of, if the user selects the permission of the print in the substitute print setting, making said printing apparatus perform the print based on the document information in accordance with the substitute print setting.

5. A method according to claim 3, wherein in said substitute presenting step, the plurality of types of print settings which can be realized in said printing apparatus are sequentially presented as a substitute print setting from the print setting of the smaller difference degree.

6. A method according to claim 3, further comprising:
   an issuing step of issuing identification information in accordance with the storage of said document information and said print set information in said information storing step; and
   a downloading step of downloading the document information and the print set information corresponding to the designated identification information,
   wherein said discriminating step compares print setting which can be realized by said printing apparatus with the print setting shown by the print set information downloaded in said downloading step, and
   wherein said calculating step calculates the difference degree between the print setting shown by the print set information downloaded in said downloading step and each of the plurality of types of print settings.

7. A method according to claim 3, further comprising:

a selecting step of allowing a user to select a desired print setting from a plurality of substitute print settings which are presented in said substitute presenting step; and a printing step of making said printing apparatus perform the print based on the document information in accordance with the selected substitute print setting.

8. An apparatus comprising:

a downloading unit adapted to download print set information showing print setting upon printing of document information;

a discriminating unit adapted to compare print setting which can be realized by a printing apparatus with the print setting shown by the print set information and to discriminate whether a print based on the print set information can be performed in the printing apparatus or not;

a calculating unit adapted to calculate a difference degree between the print setting shown by the print set information and each of a plurality of types of print settings which can be realized by the printing apparatus and is different from the print setting shown by the print set information; and a substitute presenting unit adapted to, if it is determined by said discriminating unit that the print cannot be performed, present one of the plurality of types of print settings, in which the difference degree calculated by said calculating unit is smaller than the other of the plurality of types of print settings, as substitute print setting for the print setting shown by the print set information.

* * * * *

UNITED STATES PATENT AND TRADEMARK OFFICE
CERTIFICATE OF CORRECTION

PATENT NO. : 7,298,514 B2
APPLICATION NO. : 10/441001
DATED : November 20, 2007
INVENTOR(S) : Shunsuke Nishimura It is certified that error appears in the above-identified patent and that said Letters Patent is hereby corrected as shown below:

COLUMN 2:
Line 62, "an" should read -- the --.

COLUMN 3:
Line 25, "received" should read -- receives --.

COLUMN 4:
Line 18, Delete "is"; and
Line 34, "received" should read -- receives --.

COLUMN 6:
Line 8, "set" should read -- set for --.

COLUMN 7:
Line 38, "outputted" should read -- outputted using --; and
Line 65, "preformed," should read -- performed, --.

COLUMN 8:
Line 11, "docoument" should read -- document -- and "accordanced" should read -- accordance --.

Signed and Sealed this

Twelfth Day of August, 2008

JON W. DUDAS
*Director of the United States Patent and Trademark Office*